Nov. 8, 1949  N. F. SMITH, JR  2,487,191
DOUBLE DIODE VARIABLE FREQUENCY DIVIDER
Filed Jan. 24, 1945  2 Sheets-Sheet 1
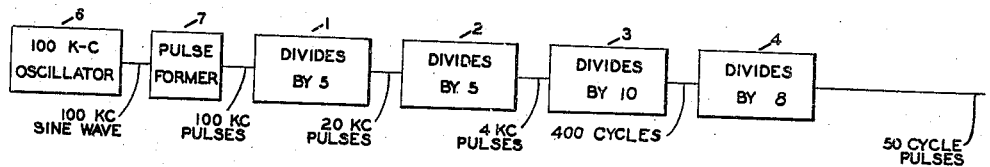
FIG. 1  DIVIDER CHAIN
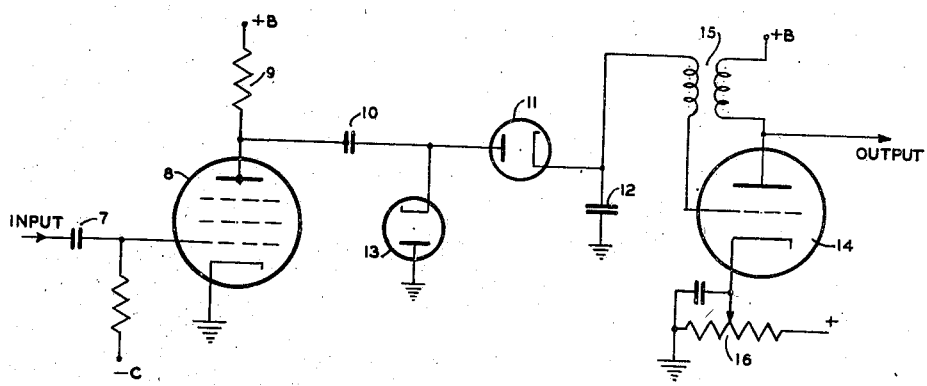
FIG. 2  TYPICAL DIVIDER STAGE
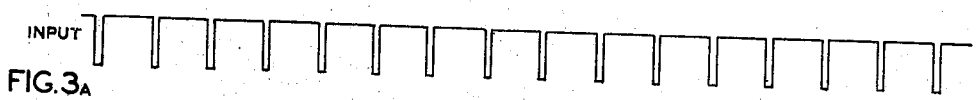
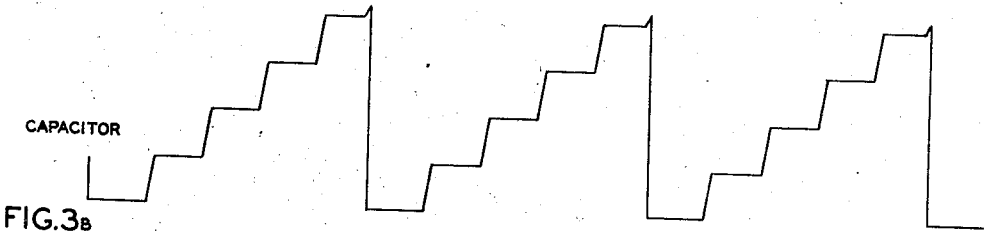
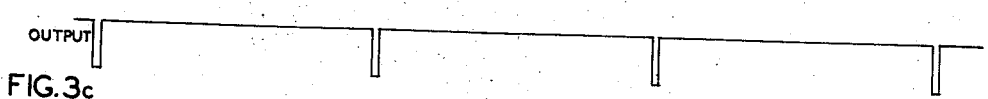
FIG. 3  WAVE SHAPES IN FIG. 2
INVENTOR
Newland F. Smith Jr.
BY
Samuel Ostrolenk
ATTORNEY Patented Nov. 8, 1949

2,487,191

UNITED STATES PATENT OFFICE 2,487,191

DOUBLE DIODE VARIABLE FREQUENCY DIVIDER

Newland F. Smith, Jr., Abington, Pa., assignor, by mesne assignments, to Philco Corporation, Philadelphia, Pa., a corporation of Pennsylvania Application January 24, 1945, Serial No. 574,270

2 Claims. (Cl. 250—27)

My invention relates to electronic means for timing events. More particularly it relates to the electronic means for timing the return of echo signals in range indicating systems, such as radar systems and the like.

In the operation of such timing systems, it at times becomes desirable to change the frequency of a series of timing pulses by a predetermined amount which is not very large compared to the frequency of the pulses themselves. Furthermore, at times it becomes desirable to effect a slight shift in the pattern of a series of timing markers. It is often desirable to cause this shift to be in such a direction that the signals are speeded up. That is, that the time marking signals occur sooner than they normally would. At other times it is desirable to have these time markers occur later than they normally would. Circuits have been available previously for procuring the speeding up operation.

My present invention constitutes a novel additional means to the circuits to effect a slowing down of the frequency of the output of the system, or to provide less shift to the signal—that is, to delay the signal by a predetermined amount.

The normal circuit used for this type of shift control is essentially a divider chain. This may, for example, start with a master oscillator at a hundred kilocycles, and this may be divided down to 50 cycles for the purpose of timing pulses.

Previous systems injected these 50 cycle pulses into the divider chain at an appropriate place in such a manner that the shift was made to the right—that is, so that the system was speeded up by one pulse per count.

My invention is the addition of a circuit which adds in this 50 cycle output in such a way that the shift is to the left, and in such a manner that the final output of the same 50 cycle pulses are slightly slowed down. Thus with the combination of my invention and previous circuits, a system is available in which the shift can be either to the right or to the left, and the final output frequency can be either raised slightly or lowered slightly.

These objects of my invention along with other objects of the invention will be better understood after a study of the specification in connection with the drawings in which Figure 1 shows a block diagram of a divider chain.

Figure 2 is a typical divider stage in schematic diagram.

Figure 3 shows the wave shapes appearing in the circuit of Figure 2.

Figure 4:
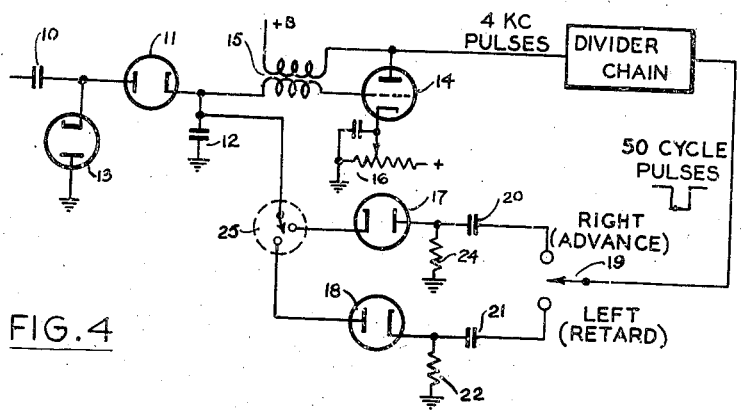
Figure 4 shows the diagram of Figure 2 modified in accordance with my invention.

The method of obtaining a series of pulses of different frequencies from a standard oscillator is shown in Figure 1. Here the 100 kc. oscillator 6 feeds a pulse former 7, the output of which is a series of pulses occurring 1/100,000 of a second apart. Thus these pulses will be called 100 kc. pulses.

Divider #1 is, in the present system, a counter circuit which counts out five pulses of the 100 kc. series, then gives one pulse output and continuously repeats this operation. Thus it produces pulses at the rate of 20 kc.

Divider #2 performs the same operation using a 20 kc. pulse as the input. Thus its output are pulses at four kc.

Divider #3 does substantially the same thing, except that it divides by ten instead of five, counting out ten pulses and then giving an output pulse. Thus the output of divider #3 is 400 cycles; and Divider #4 again divides by eight and its output are pulses at 50 cycles.

Thus in this divider chain there are a series of pulse frequencies available. A typical divider stage in this chain is shown in Figure 2. The input is passed first through a pentode vacuum tube 8 which is capacitance coupled at 7 to the input.

The load resistor 9 carries current during the time that there is no pulse on the input. If any pulse appears on the input, it is of a negative potential and thus it cuts off tube 8. Consequently the plate potential rises and current flows through resistor 9, capacitor 10, diode 11, capacitor 12. This surge of current charges capacitor 12 to a certain extent. Also it charges capacitor 10, but when tube 8 returns to the conducting state at the end of the input pulse, the capacitor 10 discharges through diode 13.

In the intermediate stages, however, it was found best in practice to omit the buffer amplifier, the connection being made directly from the output of tube 14 to the condenser.

Each time a pulse is present on the input, capacitor 12 receives additional charge. This is shown in Figure 3b in which it is observed that every time an input pulse appears, the voltage on the capacitor rises stepwise. During the period in between the presence of the pulses, there is no increase in the voltage across the capacitor 12. This stepwise increase in the capacitor voltage continues until such time as the grid of tube 14 becomes sufficiently high in potential for tube 14 to begin to conduct. This tube is connected in a blocking oscillator circuit with a feed-back transformer 15 and bias control 16. As soon as this tube begins to conduct, capacitor 12 has its charge discharged and dissipated through grid current in tube 14. As soon as this charge is all dissipated, tube 14 turns non-conducting again. In so doing it puts a pulse on the output circuit which is shown in Figure 3. In this manner the pulses on the output circuit occur once every four or once every five times (as desired) for the pulses on the input circuit.

This dividing ratio is controlled by the bias setting 16 and of course can be made anything between 2 and some number around 20. This same dividing circuit is shown in Figure 4 with the addition of a pair of feed-back diodes 17 and 18.

Figure 5:
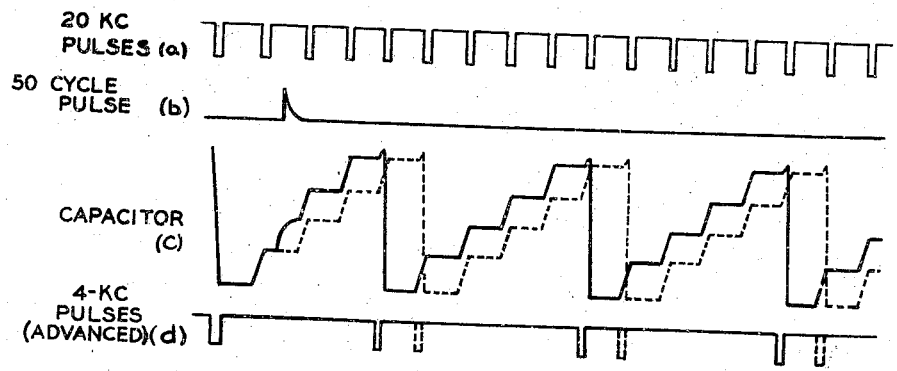
Figure 5 shows the wave shape of the circuit of Figure 4 in accordance with previously known performance.

Diode 17 has previously been used with this type of circuit. Diode 18 is arranged in accordance with my invention. The operation of diode 17 can be seen by reference to Figure 5. It is to be noted that when the switch 19 is in the up position, marked "right," that 50 cycle pulses are fed into the capacitor 20. These pulses are fairly broad, and this capacitor 20 differentiates these pulses. As the output pulse of the divider chain drops down on its leading edge, capacitor 20 differentiates this dropping down and provides a negative voltage which does not pass through diode 17. However, on the return side of the pulse when the 50 cycle pulse finishes, condenser 20 again differentiates the wave and thus gives a positive pulse to the plate of diode 17. This positive voltage causes diode 17 to conduct, and current flows through the cathode of diode 17 and capacitor 12. This then gives an additional charge to capacitor 12.

The wave shape of voltage on the capacitor shown in Figure 5c shows this situation clearly. The dotted line shows the performance without the 50 cycle pulse being fed back. It is noted that at the time of the 50 cycle pulse, which is shown here as the differentiated edge of the pulse, that that is the only part of the pulse which feeds into capacitor 12. It is observed that the capacitor 12 obtained an extra charge during its period of the 50 cycle pulse as shown by Figure 5b. This extra charge is adjusted to be just sufficient to raise the voltage on the capacitor approximately the same amount that a single 20 kc. pulse would raise the voltage on the capacitor. Thus, as is shown by the solid line of voltage on the capacitor, the capacitor voltage reaches the tripping point of tube 14 one pulse in the 20 kc. series before it would reach this point otherwise.

Consequently the four kc. pulse outputs of this circuit are advanced over what they would be without the 50 cycle additional pulse. This is shown in Figure 5c by the fact that the dotted line on the last line of wave shape shows the four kc. pulses without the diode circuit, whereas the solid lines show the actual pulses as they appear with the diode circuit in operation. Thus, this series of four kc. pulses is advanced by 1/20,000 of a second every 1/50 of a second. Since these four kc. pulses are the time interval markers in the radar system, they will appear to be shifted ahead by this action of the 50 cycle pulse.

If each sweep of the beam of the cathode ray oscilloscope of the radar system occurs every 50th of a second, then the time marker will be shifted for each such by 1/20,000 of a second. It is also interesting to note that with this feed-back system in operation, the 50 cycle pulses are no longer exactly 50 cycles. Originally with no feed-back in this system, each 50 cycle pulse had 400 of the 20 kc. in between it and the next 50 cycle pulse. That is, the 50 kc. pulses were spaced 400 of the 20 kc. pulses apart. With this feed-back system, the 50 kc. pulses are spaced 399, twenty kc. pulses apart. Thus the frequency of the 50 kc. pulses has in effect been raised by one part in 400. Consequently the new frequency is approximately 50.1254 cycles per second.

This system for speeding up the frequency of the 50 cycle pulse system or for advancing the series of four kc. pulses has been in use previously. However, until the time of my invention there was no satisfactory means for doing the opposite. That is, for retarding the four kc. pulses by 1/20,000 of a second for each 50 cycle pulse sweep. Nor was there any satisfactory means of lowering the frequency of the 50 cycle pulses to something slightly below 50 cycles.

My invention has provided means for doing this through the addition of a circuit composed of diode 18, capacitor 21 and resistor 22.

Figure 6:
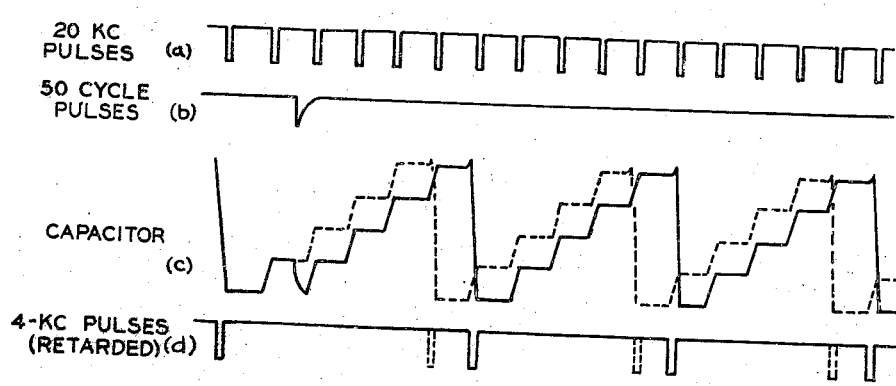
Figure 6 shows the wave shape of the circuit of Figure 4 under operation as my invention.

In operation, the switch 19 is placed on the contact marked "left" (retard). Under these circumstances when the 50 kc. pulse is on its leading edge, that is, decreasing, the capacitor 21 and the resistor 22 differentiate this pulse and give a negative pulse through diode 18 into capacitor 12. The wave shapes of these voltages are shown in Figure 6. Here the 20 kc. pulses appear as usual, but the 50 cycle pulse in Figure 6b is seen to be inverted over that shown in Figure 5. Thus the voltage across the capacitor 12 starts to rise stepwise in accordance with the previous circuits, but when the 50 cycle pulse appears, this capacitor voltage is dropped back one step. It must then start again to climb the stepwise series up to the point where the tube 14 will fire. The performance of the circuit without this particular feed-back tube 18 is shown by the dotted line in Figure 6c. With this circuit the performance is shown by the solid line, and it is to be observed that the solid line is retarded over the dotted line by 1/20,000 of a second, namely, the time for one pulse in the 20 kc. pulse series. Also, it is to be observed that the four kc. pulse series in Figure 6d is also retarded by this same amount.

Thus this circuit has accomplished the opposite of the thing which the circuit of tube 17 accomplished. Consequently my invention makes it possible to retard the sequence of four kc. pulses as well as to advance it. It is also of interest to note that with my invention the frequency of the so-called 50 cycle pulses is no longer exactly 50 cycles. Instead of 400 of the 20 kc. pulses being required to form the time between successive 50 kc. pulses, it is now necessary to have 401, twenty kc. pulses. Dividing 401 into 20,000, we obtain 49.7854 approximately cycles per second, as the new frequency of the so-called 50 kc. pulses. Thus my invention has accomplished the dual purpose of retarding the series of four kc. pulses and of lowering slightly the frequency of the 50 cycle series of pulses.

In the operation of the diode 17 in association with capacitor 20 and resistor 24, it is possible that the pulse being fed into capacitor 12 will be partially bled off through diode 18 and resistor 22. This is prevented in my invention by making the resistor 22 sufficiently high so that the amount of the pulse which is bled off is insignificant. Alternatively, a single-pole, double-pole switch 25 could be placed in the circuit in the manner indicated in Figure 4. In this manner, when diode 17 were in use, diode 18 would be completely disconnected from the circuit, and when diode 18 were in use, diode 17 would be completely disconnected from the circuit.

I have described my invention here with regard to one specific example using certain special frequencies. It is of course to be observed that the same thing could be done using other frequencies in the dividing systems. It is to be noticed also that no matter what frequencies are chosen, that the system inherently is quite stable, and that it does not depend on critical adjustment of any of the components in this system. This is a great advantage particularly in equipment which may be subjected to considerable hard usage. Where critical adjustment is required, they may easily fall out of adjustment.

In place of the diode 18, I may, if desired, employ a triode connected in the same manner as shown for the diode except that the cathode is grounded, the anode is connected as shown for the diode and the grid is driven with the 50 cycle pulse from the last divider chain. Each of these pulses will then drive the grid positive and the triode will then become a low resistance to ground and provide a discharge path for the charge on condenser 12.

The foregoing diagrams and descriptions describe a particular embodiment of my invention. I prefer however, to have my invention completely described by the following claims.

I claim:

1. In an electronic system, a source of signals of a predetermined frequency, a plurality of divider circuits each having an input and output circuit and a charging condenser connected in each input circuit, means for applying said signals to one of said charging condensers, a pair of diodes, means for selectively connecting either of said diodes in the output circuit of one of said divider circuits, the polarity connection of either diode to the output circuit being in opposed relation to that of the other diode, and means for simultaneously connecting the opposite terminal of the connected diode to the charging condenser of one of said preceding divider circuits, the pulse appearing on one of said diodes when connected in circuit, imparting a negative charge equal to the positive charge on said charging condensers produced by said source of signals to increase the number of pulses from said source necessary to raise the charge on the charging condenser to the breakdown value to thereby slow down the resultant pulse frequency in the output of said divider chain and the pulse appearing on the other of said diodes when connected in circuit imparting an additional charge on said charging condenser as if a pulse from said signal source had achieved it to reduce by one the number of pulses of the signal source necessary to raise the charge on the condenser to breakdown value.

2. In an electronic system, a source of signals of a predetermined frequency, a plurality of divider circuits each having an input and output circuit and a charging condenser connected in each input circuit, means for applying said signals to one of said charging condensers, a pair of diodes, means for selectively connecting either of said diodes in the output circuit of one of said divider circuits, the polarity connection of either diode to the output circuit being in opposed relation to that of the other diode, and means for simultaneously connecting the opposite terminal of the connected diode to the charging condenser of one of said preceding divider circuits, the pulse appearing on one of said diodes when connected in circuit, imparting a negative charge equal to the positive charge on said charging condensers produced by said source of signals to increase the number of pulses from said source necessary to raise the charge on the charging condenser to the breakdown value to thereby slow down the resultant pulse frequency in the output of said divider chain and the pulse appearing on the other of said diodes when connected in circuit imparting an additional charge on said charging condenser as if a pulse from said signal source had achieved it to reduce by one the number of pulses of the signal source necessary to raise the charge on the condenser to breakdown value, each of said diodes being connected in said last mentioned circuit to conduct current in reverse direction with respect to each other, each effecting charges on said charging condenser of reverse polarity with respect to each other.

NEWLAND F. SMITH, Jr.

REFERENCES CITED

The following references are of record in the file of this patent:

UNITED STATES PATENTS

| Number | Name | Date |
|---|---|---|
| 2,016,147 | La Pierre et al. | Oct. 1, 1935 |
| 2,113,011 | White | Apr. 5, 1938 |
| 2,258,943 | Bedford | Oct. 14, 1941 |
| 2,260,933 | Cooper | Oct. 28, 1941 |
| 2,306,386 | Hollywood | Dec. 29, 1942 |
| 2,420,516 | Bischoff | May 13, 1947 |
| 2,432,158 | Hulst | Dec. 9, 1947 |